(12) United States Patent
Eastwood et al.

(10) Patent No.: US 10,087,767 B2
(45) Date of Patent: Oct. 2, 2018

(54) PRE-DIFFUSER WITH MULTIPLE RADII

(71) Applicant: UNITED TECHNOLOGIES CORPORATION, Farmington, CT (US)

(72) Inventors: Jonathan Jeffery Eastwood, Newington, CT (US); Dave J. Hyland, Portland, CT (US); Timothy Dale, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 297 days.

(21) Appl. No.: 14/930,739

(22) Filed: Nov. 3, 2015

(65) Prior Publication Data

US 2016/0160666 A1  Jun. 9, 2016

Related U.S. Application Data

(60) Provisional application No. 62/089,683, filed on Dec. 9, 2014.

(51) Int. Cl.
*F01D 9/02* (2006.01)
*F02C 3/04* (2006.01)
(Continued)

(52) U.S. Cl.
CPC ............ *F01D 9/02* (2013.01); *F01D 5/02* (2013.01); *F01D 5/141* (2013.01); *F01D 9/04* (2013.01); *F01D 9/041* (2013.01); *F01D 25/162* (2013.01); *F02C 3/04* (2013.01); *F05D 2220/32* (2013.01); *F05D 2230/00* (2013.01);
(Continued)

(58) Field of Classification Search
CPC ... F01D 9/02; F01D 9/04; F01D 9/041; F01D 5/141; F05D 2240/12; F05D 2240/121
See application file for complete search history.

(56) References Cited

U.S. PATENT DOCUMENTS

2004/0081548 A1* 4/2004 Zess .................. F01D 5/145
                                                    415/1
2010/0316484 A1* 12/2010 Jasko .................. F01D 9/041
                                                    415/1
(Continued)

FOREIGN PATENT DOCUMENTS

EP       2441918 A1    4/2012
EP       2484869 A2    8/2012
(Continued)

OTHER PUBLICATIONS

European Search Report for Application No. 15198718.7-1610; dated May 12, 2016; 8 pgs.
EP Search Report, International Application No. 15171738.6-1610, dated Oct. 21, 2015, 6 pages.

*Primary Examiner* — Steven Sutherland
(74) *Attorney, Agent, or Firm* — Cantor Colburn LLP

(57) ABSTRACT

A pre-diffuser may include a plurality of struts, and each strut may have a leading edge. An upper contour of the leading edge may have a forward end and an aft end, and may include a first radius and a second radius. The first and second radii may be associated with the forward end and the aft end, respectively. The first radius may also be located farther forward than the second radius, and may be larger than the second radius.

13 Claims, 10 Drawing Sheets

(51) Int. Cl.
*F01D 5/02* (2006.01)
*F01D 5/14* (2006.01)
*F01D 9/04* (2006.01)
*F01D 25/16* (2006.01)

(52) U.S. Cl.
CPC ...... *F05D 2230/10* (2013.01); *F05D 2230/21* (2013.01); *F05D 2240/12* (2013.01); *F05D 2240/121* (2013.01); *F05D 2240/24* (2013.01); *F05D 2240/35* (2013.01); *F05D 2250/71* (2013.01); *F05D 2300/175* (2013.01); *F05D 2300/177* (2013.01); *Y02T 50/671* (2013.01); *Y02T 50/673* (2013.01)

(56) References Cited

U.S. PATENT DOCUMENTS

| 2011/0286847 A1* | 11/2011 | King ...................... F01D 9/041 |
| | | 416/179 |
| 2013/0209246 A1* | 8/2013 | Gbadebo ................. F01D 5/141 |
| | | 415/207 |

FOREIGN PATENT DOCUMENTS

| EP | 2559850 A1 | 2/2013 |
| EP | 2604794 A1 | 6/2013 |
| WO | 2012007716 A1 | 1/2012 |
| WO | 2014105735 A1 | 7/2014 |

\* cited by examiner

PRE-DIFFUSER WITH MULTIPLE RADII

CROSS-REFERENCE TO RELATED APPLICATIONS

This patent application claims priority under the 35 USC § 119(e) to U.S. Provisional Patent Application Ser. No. 62/089,683, filed on Dec. 9, 2014.

TECHNICAL FIELD

This disclosure generally relates to gas turbine engines and, more particularly, relates to a pre-diffuser strut system.

BACKGROUND

Many modern aircraft, as well as other vehicles and industrial processes, employ gas turbine engines for generating energy and propulsion. Such engines include a fan, compressor, combustor and turbine provided in serial fashion and arranged along a central longitudinal axis. Air enters the gas turbine engine through the fan and is pressurized in the compressor. This pressurized air is mixed with fuel in the combustor. The fuel-air mixture is then ignited, generating hot combustion gases that flow downstream to the turbine. The turbine is driven by the exhaust gases and mechanically powers the compressor and fan via a central rotating shaft. Energy from the combustion gases not used by the turbine is discharged through an exhaust nozzle, producing thrust to power the aircraft.

Gas turbine engines contain an engine core and fan surrounded by a fan case, forming part of a nacelle. The nacelle is a housing that contains the engine. The fan is positioned forward of the engine core and within the fan case. The engine core is surrounded by an engine core cowl and the area between the nacelle and the engine core cowl is functionally defined as a bypass duct. The bypass duct is substantially annular in shape to accommodate the airflow from the fan and around the engine core cowl. The airflow through the bypass duct, known as bypass air, travels the length of the bypass duct and exits at the aft end of the bypass duct at an exhaust nozzle.

In addition to thrust generated by combustion gasses, the fan of gas turbine engines also produces thrust by accelerating and discharging ambient air through the exhaust nozzle. Various parts of the gas turbine engine generate heat while operating, including the compressor, combustor, turbine, central rotating shaft and fan. To maintain proper operational temperatures, excess heat is often removed from the engine (via oil coolant loops, including air/oil or fuel/oil heat exchangers) and dumped into the bypass duct airflow for removal from the system.

As compressed air travels downstream from the compressor, it passes through a pre-diffuser prior to entering the combustor. The pre-diffuser directs the airflow through passages with expanding areas, slowing the airflow and allowing for a more efficient combustion process. The pre-diffuser may include inner diameter and outer diameter walls connected by a plurality of struts. The passages are defined by the walls and struts.

As the gas turbine engine operates, various components may absorb different amounts of heat energy. This absorption, along with part location, build loading and part material, may cause different degrees of thermal expansion. This thermal expansion may cause stresses on certain gas turbine engine parts or locations, such as the leading edge of a strut, or the junction between a strut and an inner or outer diameter wall. Prior strut arrangements can adversely localize strains or hinder air flow through the passages.

Accordingly, there is a need for an improved pre-diffuser strut for a gas turbine engine.

SUMMARY OF THE DISCLOSURE

In an embodiment, the present disclosure provides a strut for use in a pre-diffuser of a gas turbine engine that may comprise the strut having a leading edge, the leading edge including an upper contour, the upper contour having a forward end and an aft end, and the forward end having a larger radius than the aft end.

In a further embodiment of any of the foregoing embodiments, the leading edge may further include a lower contour, the lower contour may have a lower contour forward end and a lower contour aft end, and the lower contour forward end may have a larger radius than the lower contour aft end.

In a further embodiment of any of the foregoing embodiments, the upper contour may include more than two radii.

In a further embodiment of any of the foregoing embodiments, the upper contour may include a constantly decreasing radius.

In a further embodiment of any of the foregoing embodiments, the upper contour may include an infinite radius.

In a further embodiment of any of the foregoing embodiments, the strut may be a nickel alloy.

In a further embodiment of any of the foregoing embodiments, the strut may be Inconel 718™.

In a further embodiment of any of the foregoing embodiments, the strut may be a casting.

In a further embodiment of any of the foregoing embodiments, the strut may be machined.

In an embodiment, the present disclosure also provides a gas turbine engine that may include a compressor and a pre-diffuser downstream of the compressor, the pre-diffuser may include a strut having a leading edge including an upper contour, the upper contour may have a forward end and an aft end, the forward end may have a larger radius than the aft end, a combustor downstream of the pre-diffuser, and a turbine downstream of the combustor.

In a further embodiment of any of the foregoing embodiments, the leading edge may further include a lower contour, the lower contour may have a lower contour forward end and a lower contour aft end, and the lower contour forward end may have a larger radius than the lower contour aft end.

In a further embodiment of any of the foregoing embodiments, the upper contour may include more than two radii.

In a further embodiment of any of the foregoing embodiments, the upper contour may include a constantly decreasing radius.

In a further embodiment of any of the foregoing embodiments, the upper contour may include an infinite radius.

In a further embodiment of any of the foregoing embodiments, the strut may be a nickel alloy.

In a further embodiment of any of the foregoing embodiments, the strut may be Inconel 718™.

In a further embodiment of any of the foregoing embodiments, the strut may be a casting.

In a further embodiment of any of the foregoing embodiments, the strut may be machined.

In an embodiment, the present disclosure further provides a method of forming a strut of a gas turbine engine that may comprise including a pre-diffuser incorporating a strut, the strut may have a leading edge with an upper contour having a forward end and an aft end, and shaping the strut such that the forward end has a larger radius than the aft end.

In a further embodiment of any of the foregoing embodiments, the leading edge may include a lower contour having a lower contour forward end and a lower contour aft end, the lower contour forward end may have a larger radius than the lower contour aft end.

These, and other aspects and features of the present disclosure, will be better understood upon reading the following detailed description when taken in conjunction with the accompanying drawings.

BRIEF DESCRIPTION OF THE DRAWINGS

For further understanding of the disclosed concepts and embodiments, reference may be made to the following detailed description, read in connection with the drawings, wherein like elements are numbered alike, and in which.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION OF THE INVENTION

Figure 1:
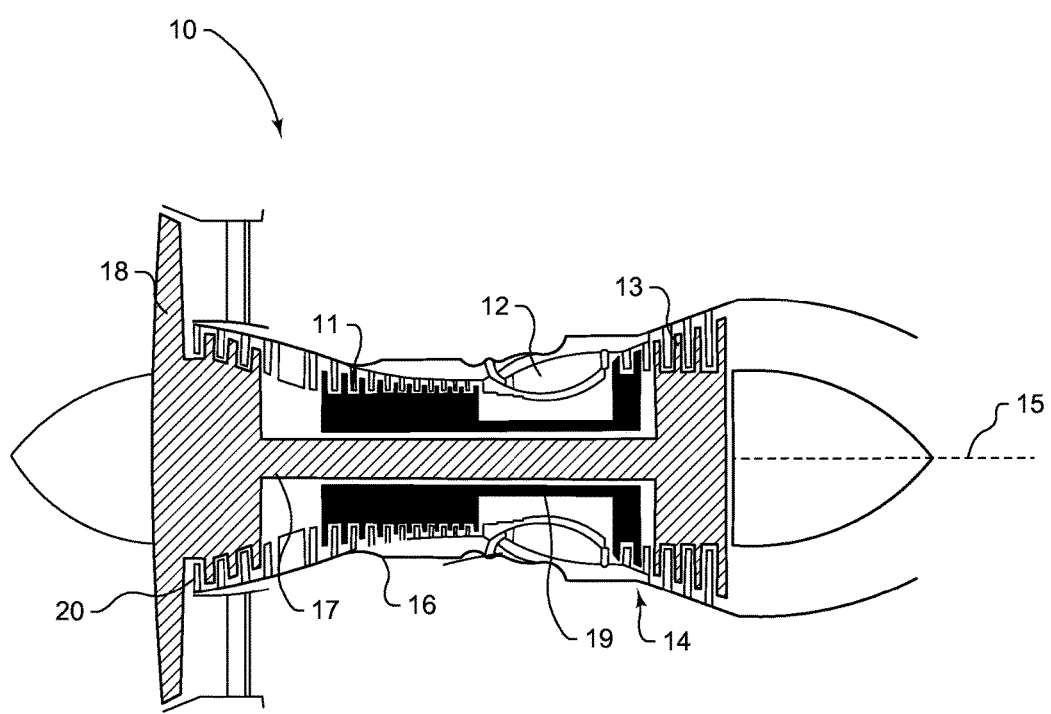
FIG. 1 is a sectional view of a gas turbine engine constructed in accordance with an embodiment of the present disclosure.

Turning now to the drawings, and with specific reference to FIG. 1, a gas turbine engine constructed in accordance with the present disclosure is generally referred to by reference numeral 10. The gas turbine engine 10 includes a compressor 11, combustor 12 and turbine 13, known as the engine core 14, lying along a central longitudinal axis 15, and surrounded by an engine core cowl 16. The compressor 11 is connected to the turbine 13 via a central rotating shaft 17. Additionally, in a typical multi-spool design, plural turbine 13 sections are connected to, and drive, corresponding plural sections of the compressor 11 and a fan 18 via the central rotating shaft 17 and a concentric rotating shaft 19, enabling increased compression efficiency.

As is well known by those skilled in the art, ambient air enters the compressor 11 at an inlet 20, is pressurized, and is then directed to the combustor 12, mixed with fuel and combusted. This generates combustion gases that flow downstream to the turbine 13, which extracts kinetic energy from the exhausted combustion gases. The turbine 13, via central rotating shaft 17 and concentric rotating shaft 19, drives the compressor 11 and the fan 18, which draws in ambient air. Thrust is produced both by ambient air accelerated aft by the fan 18 and by exhaust gasses exiting from the engine core 14.

Figure 2:
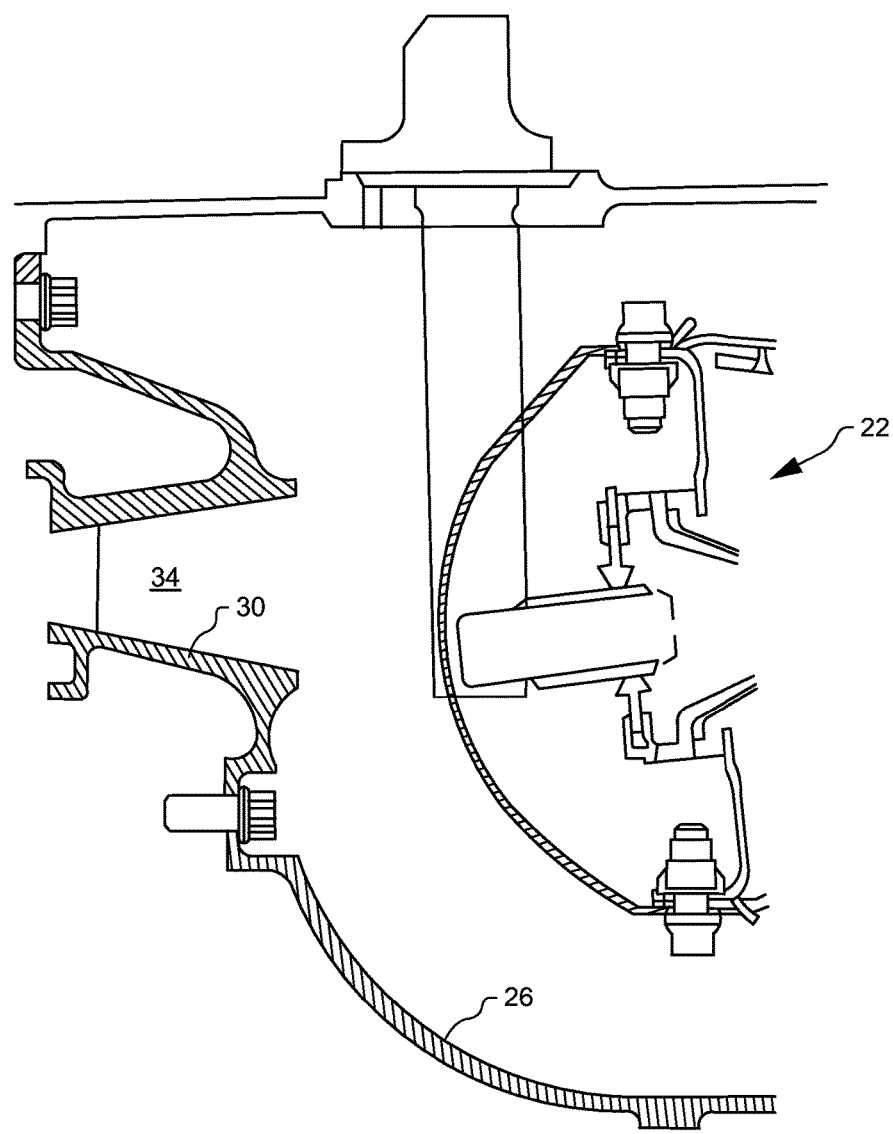
FIG. 2 is a side sectional view of a combustor assembly constructed in accordance with an embodiment of the present disclosure.
Figure 3:
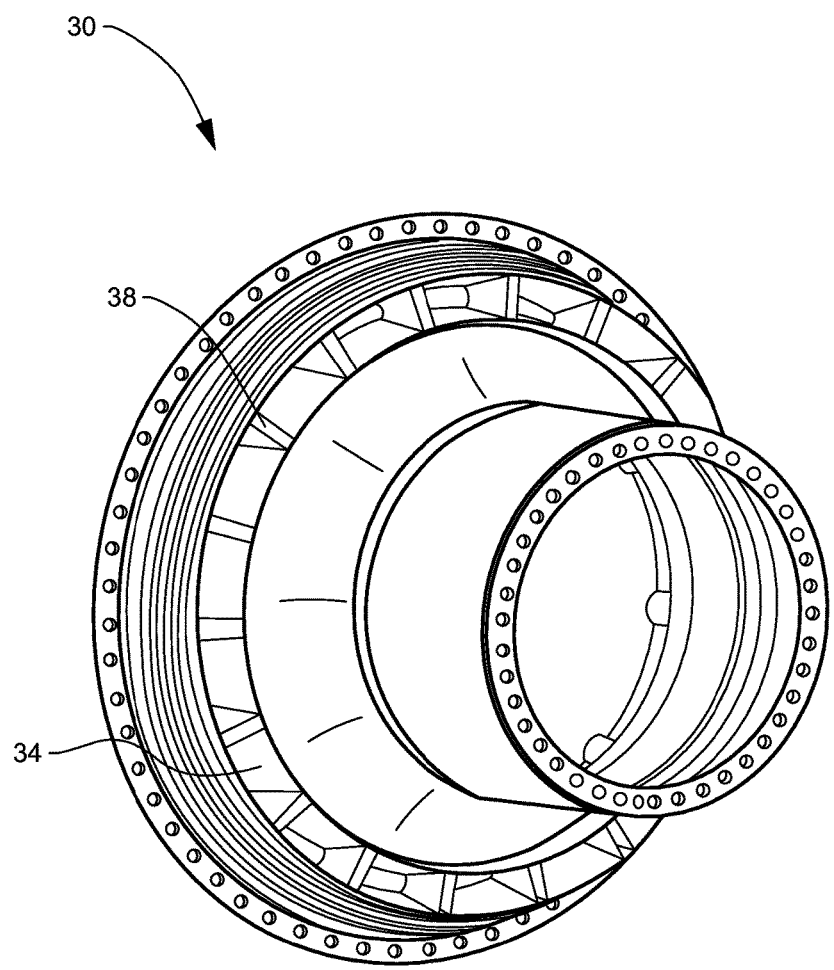
FIG. 3 is a perspective view of a pre-diffuser as described in an embodiment of the present disclosure.

As air enters the compressor 11, it is accelerated aft at high speed and pressure. Prior to reaching a combustor assembly 22 and an inner diffuser case 26, as shown in FIG. 2, the compressed air passes through a pre-diffuser 30. The pre-diffuser 30 may contain passages 34 allowing air to flow through to the combustor assembly 22. These passages 34, as further shown in FIG. 3, include expanding areas to slow the airflow from the compressor 11 and allow a more efficient combustion in the combustor assembly 22. One or more struts 38 may be employed for use as structural pre-diffuser 30 members and to partition the passages 34.

Figure 4:
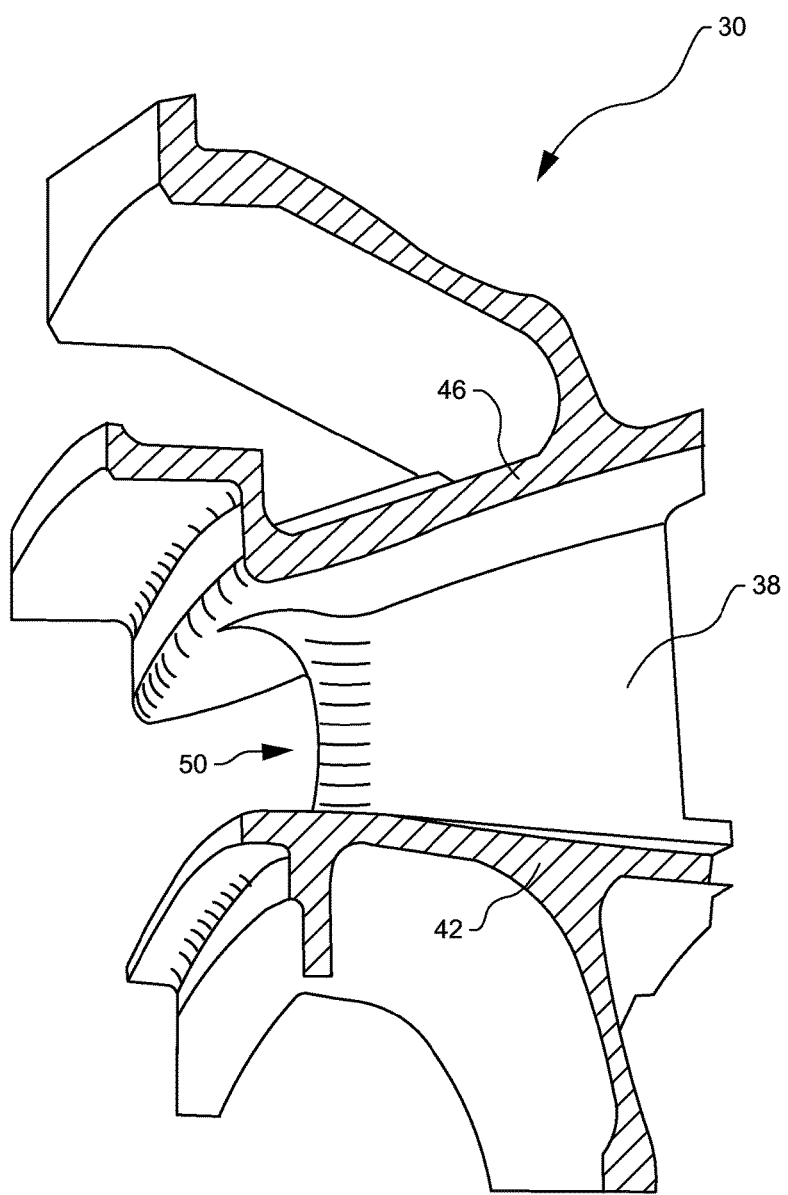
FIG. 4 is a perspective sectional view of a strut as described in an embodiment of the present disclosure.

The pre-diffuser 30 may include an inner diameter wall 42 and an outer diameter wall 46, as best shown in FIG. 4. The inner diameter wall 42 and outer diameter wall 46 may be connected by a plurality of struts 38. Further, the passages 34 may be bounded by the inner and outer diameter walls 42, 46 and adjacent struts 38. The forward edge of the strut 38 may be defined as the leading edge 50

As the gas turbine engine 10 operates, various components may absorb different amounts of heat energy. This absorption, along with part location, build loading and part material, may cause different degrees of thermal expansion. This thermal expansion may cause stresses on certain gas turbine engine 10 parts or locations, including the strut 38, leading edge 50 or the juncture between the strut 38 and the inner or outer diameter wall 42, 46. In conventional pre-diffusers, stresses due to thermal expansion, or other causes, may gradually weaken a part, leading to increased acquisition or maintenance costs, increased repair times or part fatigue.

Figure 5:
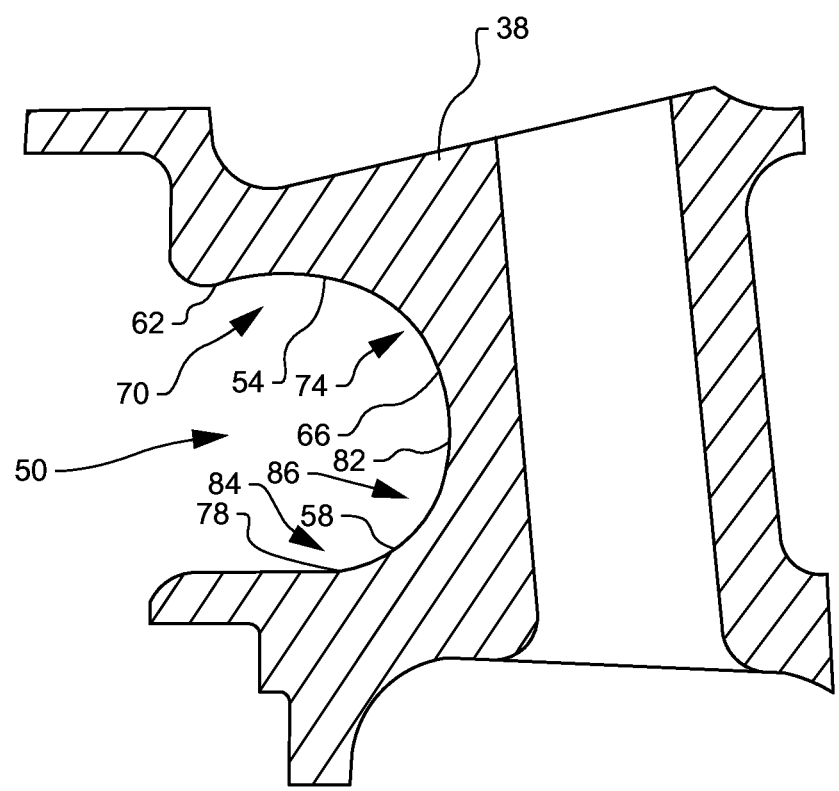
FIG. 5 is a sectional view of a strut constructed in accordance with an embodiment of the present disclosure.

Accordingly, to improve on prior designs, a strut 38 as shown in FIG. 5 may have a leading edge 50 with an upper contour 54 and a lower contour 58. The upper contour 54 may have a forward end 62 and an aft end 66. As shown, in FIGS. 5 and 6, the upper contour 54 may include a first radius 70 and a second radius 74. The first and second radii 70, 74 may be associated with the forward end 62 and the aft end 66, respectively. The first radius 70 may also be located farther forward than the second radius 74.

Further, the lower contour 58 may have a lower contour forward end 78 and a lower contour aft end 82, as shown in FIG. 5. The lower contour 58 may also have a first lower radius 84 and a second lower radius 86. The first and second lower radii 84, 86 may be associated with the lower contour forward end 78 and the lower contour aft end 82, respectively. The first lower radius 84 may also be located farther forward than the second lower radius 86.

Figure 6:
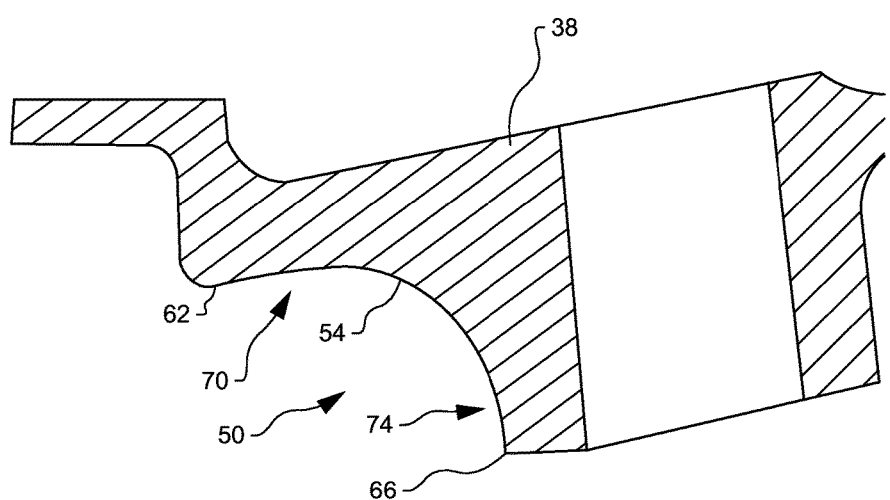
FIG. 6 is another sectional view of a strut constructed in accordance with an embodiment of the present disclosure.

The first radius 70 may be larger than the second radius 74, as best shown in FIGS. 5 and 6. Including the larger first radius 70 forward of the smaller second radius 74 allows a greater contact area between the outer diameter wall 46 and the strut 38. This larger contact area may better disperse loads between the two parts than would a smaller contact area, lessening the strain experienced at a single particular point at the juncture. The use of a larger radius forward and a smaller radius aft allows this larger contact area while minimizing the material used in the part, leading to lower weight, lower costs and increased performance. Further, the more gradual airflow transition from the parallel (with respect to the airflow) outer diameter wall 46 to the perpendicular portion of the leading edge 50 provided by the larger forward radius smooths the airflow through the passages 34 and reduces internal drag losses.

In an embodiment, as shown in FIG. 5, the lower contour 58 may also have a larger and relatively forward first lower radius 84 and a smaller and relatively aft second lower radius 86. This arrangement, along the lower contour 58, is conceptually the same as that of the upper contour 54 curvature described above. However, in this variant, the transition and contact are between the inner diameter wall 42 and the strut 38.

Figure 7:
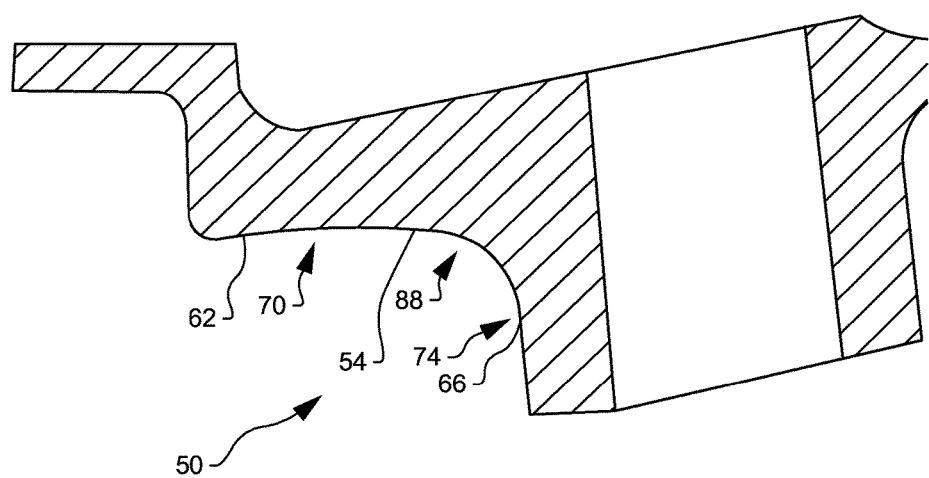
FIG. 7 is another embodiment of the strut of FIG. 6 constructed in accordance with the present disclosure.

In another embodiment, the upper contour 54 may include more than two radii, as shown in FIG. 7. A third radius 88 may enable a more finely-tuned design, as the more than two radii may be shaped to more effectively distribute stresses and loads than an upper contour 54 with only two radii.

Figure 8:
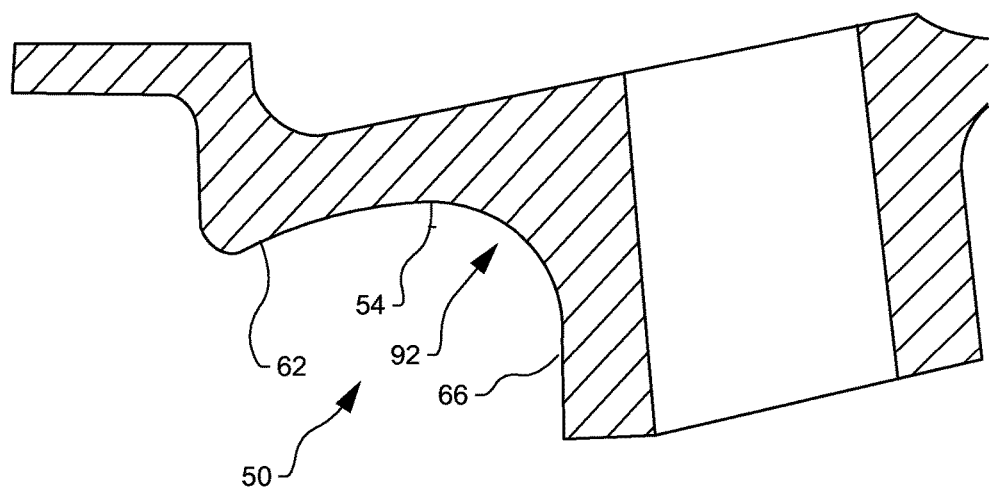
FIG. 8 is another embodiment of the strut of FIG. 6 constructed in accordance with the present disclosure.

In yet another embodiment, the upper contour 54 may include a constantly decreasing radius 92, as shown in FIG. 8. In this embodiment, the upper contour 54 may include a non-constant and decreasing radius to distribute stresses and decrease internal aerodynamic drag.

Figure 9:
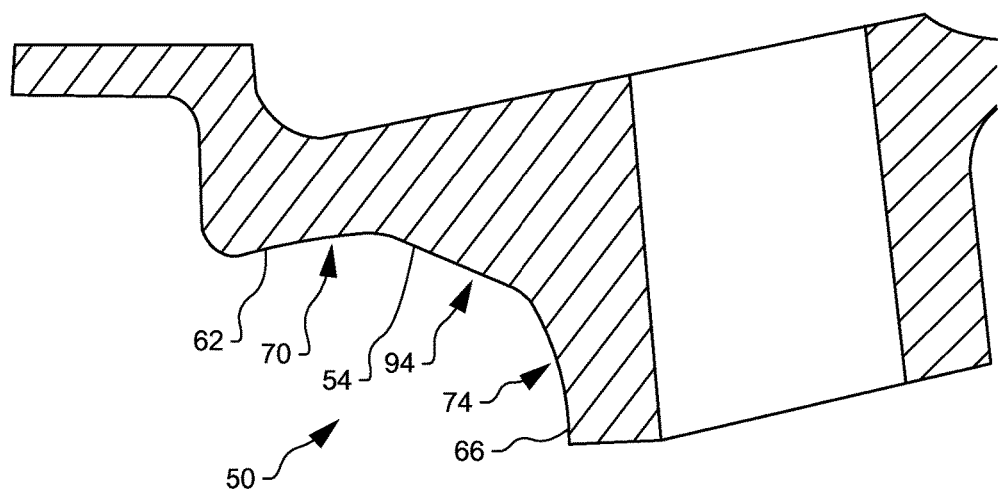
FIG. 9 is a further embodiment of the strut of FIG. 6 constructed in accordance with the present disclosure.

In an additional embodiment, the upper contour 54 may include an infinite radius 94, as best shown in FIG. 9. In this embodiment, the upper contour 54 may include a straight and liner section with a radius value equal to infinity.

With respect to materials, the strut 38 may be formed from a nickel alloy, although many other materials are possible. With specific reference to nickel alloy, however, the nickel alloy may be Inconel 718™. Further the strut 38 may be a casting or a machined part.

Figure 10:
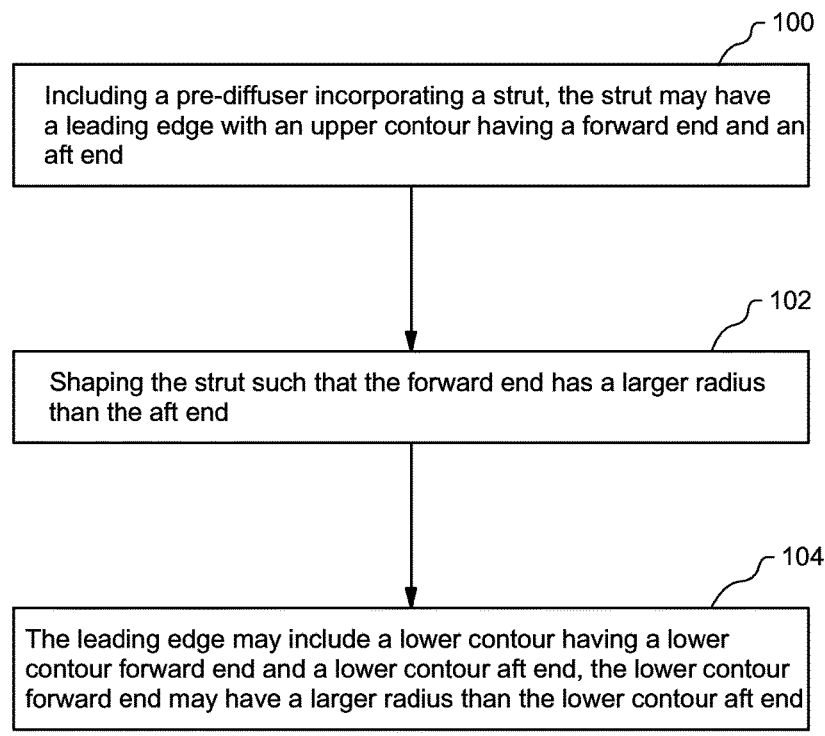
FIG. 10 is a flowchart depicting a sample sequence of steps which may be practiced using the teachings of the present disclosure.

A method for forming a strut 38 of a gas turbine engine 10 can best be understood by referencing the flowchart in FIG. 10. The method may comprise including a pre-diffuser incorporating a strut, the strut may have a leading edge with an upper contour having a forward end and an aft end 100, and shaping the strut such that the forward end has a larger radius than the aft end 102. Further, the leading edge may include a lower contour having a lower contour forward end and a lower contour aft end, the lower contour forward end may have a larger radius than the lower contour aft end 104.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

In operation, the present disclosure sets forth a pre-diffuser 30 which can find industrial applicability in a variety of settings. For example, the disclosure may be advantageously employed in reinforcing various parameters and reducing internal drag characteristics in a gas turbine engine 10.

More specifically, the pre-diffuser 30 may include a plurality of struts 38, and each strut may have a leading edge 50. The upper contour 54 of the leading edge 50 may have a forward end 62 and an aft end 66, and may include a first radius 70 and a second radius 74. The first and second radii 70, 74 may be associated with the forward end 62 and the aft end 66, respectively. The first radius 70 may also be located farther forward than the second radius 74.

The pre-diffuser 30 of the present disclosure contributes to a gas turbine engine's 10 continued and efficient operation. The disclosed pre-diffuser 30 may be original equipment on new gas turbine engines 10, or added as a retrofit to existing gas turbine engines 10.

What is claimed is:

1. A pre-diffuser for a combustor of a gas turbine engine having an axis, the pre-diffuser comprising:
   a strut having a leading edge and a trailing edge, the leading edge having
   an upper contour located at a first radial distance from the axis, the upper contour having an upper contour forward end and an upper contour aft end, wherein the upper contour forward end transitions into the upper contour aft end, and wherein the upper contour forward end has a larger radius than a radius of the upper contour aft end, and wherein the upper contour includes an infinite radius;
   a lower contour located at a second radial distance from the axis, the first radial distance being greater than the second radial distance, and wherein the lower contour has a lower contour forward end and a lower contour aft end, wherein the lower contour forward end transitions into the lower contour aft end, and wherein the lower contour forward end has a larger radius than a radius of the lower contour aft end; and
   wherein the upper contour aft end is connected to the lower contour aft end.

2. The pre-diffuser of claim 1, wherein the upper contour includes more than two radii.

3. The pre-diffuser of claim 1, wherein the strut is a nickel alloy.

4. The pre-diffuser of claim 1, wherein the strut is Inconel 718™.

5. The pre-diffuser of claim 1, wherein the strut is a casting.

6. The pre-diffuser of claim 1, wherein the strut is machined.

7. A gas turbine engine having an axis, the gas turbine engine comprising:
   a compressor and a pre-diffuser downstream of the compressor, the pre-diffuser including:
   a strut having a leading edge and a trailing edge, the leading edge having
   an upper contour located at a first radial distance from the axis, the upper contour having an upper contour forward end and an upper contour aft end, wherein the upper contour forward end transitions into the upper contour aft end, and wherein the upper contour forward end has a larger radius than a radius of the upper contour aft end, and wherein the upper contour includes an infinite radius;
   a lower contour located at a second radial distance from the axis, the first radial distance being greater than the second radial distance, and wherein the lower contour has a lower contour forward end and a lower contour aft end, wherein the lower contour forward end transitions into the lower contour aft end, and wherein the lower contour forward end has a larger radius than a radius of the lower contour aft end; and
   wherein the upper contour aft end is connected to the lower contour aft end;
   a combustor downstream of the pre-diffuser; and
   a turbine downstream of the combustor.

8. The gas turbine engine of claim 7, wherein the upper contour includes more than two radii.

9. The gas turbine engine of claim 7, wherein the strut is a nickel alloy.

10. The gas turbine engine of claim 7, wherein the strut is Inconel 718™.

11. The gas turbine engine of claim 7, wherein the strut is a casting.

12. The gas turbine engine of claim 7, wherein the strut is machined.

13. A method of manufacturing a gas turbine engine having an axis, the method comprising:
   manufacturing a pre-diffuser, the pre-diffuser comprising a strut having a leading edge and a trailing edge, wherein the leading edge has
   an upper contour located at a first radial distance from the axis, the upper contour having an upper contour forward end and an upper contour aft end, wherein the upper contour forward end transitions into the upper contour aft end, and wherein the upper contour forward end has a larger radius than a radius of the upper contour aft end, wherein the upper contour includes an infinite radius;
   a lower contour located at a second radial distance from the axis, the first radial distance being greater than the second radial distance, and wherein the lower contour has a lower contour forward end and a lower contour aft end, wherein the lower contour forward end transitions into the lower contour aft end, and wherein the lower contour forward end has a larger radius than a radius of the lower contour aft end; and
   wherein the upper contour aft end is connected to the lower contour aft end.

\* \* \* \* \*